Patented Jan. 14, 1930

1,743,635

UNITED STATES PATENT OFFICE

SAMUEL LEWIS SUMMERS, OF FORT WASHINGTON, PENNSYLVANIA

METHYLENE-DISALICYLIC ACID DERIVATIVE

No Drawing.  Application filed October 12, 1928.  Serial No. 312,203.

My invention relates to organic compounds and their manufacture and is especially concerned with a novel iodination product of the condensation product of methylene-disalicylamide with pyruvic acid and benzaldehyde. My new product is useful for pharmaceutical purposes, as hereinafter set forth.

My product may be prepared as follows:

Starting with methylene-disalicylic acid, the first step is esterification. Various homologous esters may be produced in the manner hereinafter described,—by using the corresponding methyl, ethyl, propyl or other alcohols, with a corresponding difference in the final product. A way of carrying out the esterification with ethyl alcohol is as follows:

Dissolve 288 lbs. of methylene-disalicylic acid in 150 lbs. of ethyl alcohol, and slowly add to the solution, at a temperature of 70° C., a solution of 60 lbs. 66° Bé. sulphuric acid diluted with 40 lbs. of water. When this has all been added, raise the temperature to 150° C. under a reflux condenser, and hold at this temperature for about 2 hours. The essential producet is the ester, methylene-diethyl-salicylate.

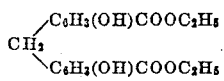

This may be washed free of any sulphuric acid left over from the reaction.

The next main step is to convert this ester to an amide, which may be done as follows:

Dissolve the ester in 120 lbs. of strong aqueous ammonia ("concentrated", or 28%NH), and heat the solution under pressure (in an autoclave) maintaining it at a temperature of 110° C. for eight hours. The essential product is methylene-disalicyl-amide, having the formula:

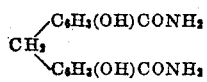

The next main step is a condensation treatment of this amide with benzaldehyde, which may be performed as follows:

Mix and heat 348 lbs. of this amide (prepared as above described, or in any other suitable way) under a reflux condenser with 212 lbs. of benzaldehyde and a condensing agent (say 212 lbs. of zinc chloride), and also 522 lbs. of ethyl alcohol,—these proportions being by weight,—maintaining a temperature of about 80° C. for 48 hours. The essential product appears to be a methylene-dibenzal-disalicyl compound, corresponding to the empirical formula $C_{29}H_{22}O_4N_2$. I believe the reaction and the structural formula of the product to be as follows:

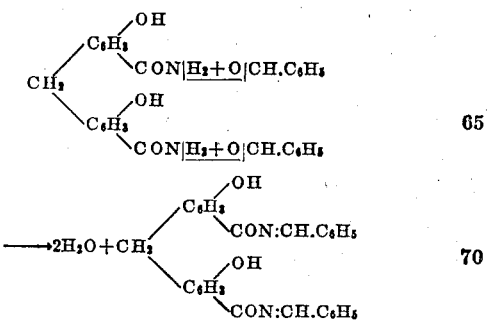

The next step is a condensation treatment of this product (the methylene-dibenzylidene-disalicyl compound) with pyruvic acid, which may be performed as follows:

Mix the said product, obtained as above described, with 200 lbs. of pyruvic acid, and heat to 130° C., maintaining this temperature for 24 hours. The essential product (difficult to name) appears to correspond to the empirical formula $C_{35}H_{26}O_8N_2$ and I believe its structural formula to be:

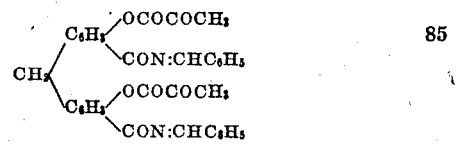

The next main step is the iodination of the above described condensation product of methylene-disalicylamide with pyruvic acid and benzaldehyde.

One way of accomplishing this is to add a solution of 254 parts by weight of iodine in alcohol to an alcoholic solution of 602 parts of the above named condensation product and then an excess of mercury oxide or other heavy metal oxide. This mixture is heated under a reflux condenser for two hours. After cooling, the heavy metal is precipitated by the addition of ammonium sulphide and the solution filtered. Evaporation of the filtrate yields the essential product. This I believe has the empirical formula $C_{35}H_{24}O_8N_2I_2$ and the structural formula:

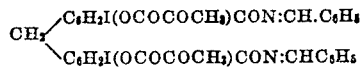

This new product is practically tasteless and is insoluble in water but soluble in alcohol. It has valuable pharmaceutical properties and is useful particularly as an antiseptic, antineuralgic, antiarthritic and antirheumatic. The dose (internally) may be 90 to 180 grains per day.

Having thus described my invention, I claim:

1. The hereindescribed iodination product of the condensation product of methylene-disalicylamide successively with benzaldehyde and pyruvic acid; insoluble in cold water, but soluble in alcohol.

2. The hereindescribed iodination product of the condensation product of methylene-disalicylamide with pyruvic acid and benzaldehyde, insoluble in cold water, but soluble in alcohol and having the empirical formula $C_{35}H_{24}O_8N_2I_2$.

In testimony whereof, I have hereunto signed my name at Ambler, Penna., this 9th day of October 1928.

SAMUEL LEWIS SUMMERS